United States Patent

[11] 3,552,256

[72] Inventors Randolph Spencer Soanes
Willowdale;
John D. Fourdraine, Toronto; Egon S.
Manthey, Don Mills, Ontario, Canada
[21] Appl. No. 771,254
[22] Filed Oct. 28, 1968
[45] Patented Jan. 5, 1971
[73] Assignee Rice Honeywell
Willowdale, Ontario, Canada
by mesne assignments

[54] TEACHING DEVICE FOR MUSICAL INSTRUMENTS
6 Claims, 3 Drawing Figs.
[52] U.S. Cl. ..................................................... 84/478,
35/6, 35/35.2, 84/470
[51] Int. Cl. ....................................................... G09b 15/08
[50] Field of Search ............................................. 84/470,
477, 478, 482, 485; 35/6, 35.2

[56] References Cited
UNITED STATES PATENTS
2,814,230  11/1957  Johnston ..................... 84/478
3,379,087  4/1968  Weitzner ..................... 84/478

Primary Examiner—Richard B. Wilkinson
Assistant Examiner—Lawrence R. Franklin
Attorney—Rogers, Bereskin and Parr ABSTRACT: A teaching device primarily intended for keyboard instruments having a plurality of lamps arranged in a row above the keyboard, each lamp corresponding to a particular key. Beside each lamp is a switch, which is actuated when the key is depressed. A lesson (consisting of a piece of music to be played) is recorded on paper tape, and indicia recorded on the tape is read by a tape reader mechanism and is used for controlling the illumination of the lamps. At the start of a lesson, certain lamps are illuminated, indicating certain notes to be played, and when these notes have been played correctly the lamps are briefly extinguished, and the tape reader mechanism automatically is advanced to its next position whereupon a new sequence of lamps is illuminated.

INVENTORS
RANDOLPH SPENCER SOANES
JOHN D. FOURDRAINE
EGON S. MANTHEY

BY *Rogers, Bereskin, & Parr*

TEACHING DEVICE FOR MUSICAL INSTRUMENTS

This invention relates to an improved apparatus for teaching students to play musical instruments, particularly keyboard instruments such as piano and organ.

Objects of the invention are to provide an apparatus of the above kind that is efficient, economical to produce, and reliable in operation.

Previous teaching devices of this general kind have employed tape readers for controlling the illumination of a plurality of lamps arranged in a row above the keyboard. Each lamp is respectively positioned above each key, and the illumination of the lamps tells the student which key to play. Although a preferred embodiment of the present invention also employs a tape reader and a row of lamps positionable over a keyboard, it will be clear from a study of the accompanying specification that the present invention bears only superficial similarities to such prior devices, and that the prior devices do not provide the results achieved by the present invention.

In accordance with the invention, the illumination of a row of lamps positioned over a keyboard is controlled by a tape reader mechanism and associated circuitry. Music to be played is recorded on a tape in the form of holes at predetermined locations on the tape. At specific positions on the tape, certain lamps are illuminated to denote the keys to be played. At the start of a sequence of operation, predetermined lamps are illuminated and nothing further happens until the student correctly plays all of the keys identified by the illuminated lamps. Upon playing the correct keys, the lamps are momentarily extinguished, and the tape automatically is advanced to the next position where a new sequence of notes is to be played, whereupon appropriate lamps corresponding to the new sequence of notes are illuminated. The operation is repeated until the entire lesson recorded on the tape has been performed by the student. A feature of the invention is that the teaching device can be operated in an inverse mode, wherein the student reads the notes from sheet music (instead of observing the illuminated lamps) and the lamps are initially extinguished. Upon correctly playing the notes, the lamps are momentarily illuminated and the tape advance mechanism is activated to move the tape to the next position corresponding to the next sequence of notes to be played. Another feature of the invention is that means is provided for varying the speed of the tape advance mechanism as desired, so that as the student becomes more proficient he can activate the device quickly enough to play music at the intended speed. In both the normal and inverse modes of the device, the operation of the tape reader is stepwise, and the teaching device remains passive unless and until the correct notes have been played.

In drawings illustrating a preferred embodiment of the invention:

Figure 1:
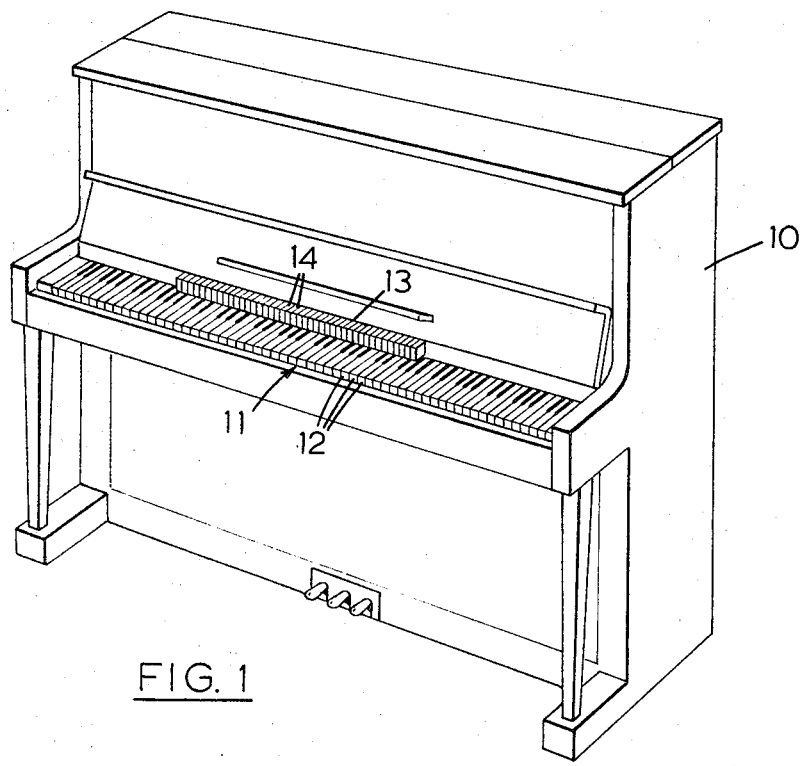
FIG. 1 is a perspective view of a piano having a compartmented lamp housing positioned above the keys.
Figure 2:
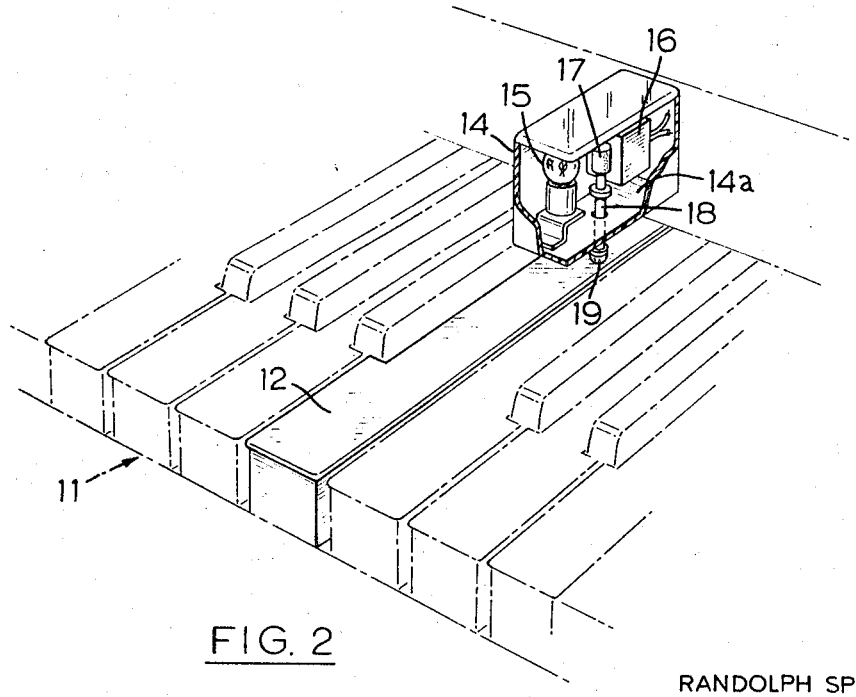
FIG. 2 is a perspective view, partly broken away, of a typical compartment of the housing shown in FIG. 1, showing some of the internal parts.

Referring to the drawings, a piano 10 or other keyboard instrument (such as an organ) is provided with a keyboard 11 having a plurality of keys 12. Positioned above the keyboard is a compartmented housing 13 having a plurality of compartments 14 respectively aligned with the keys 12. In each compartment 14 there is a small lamp 15 and a magnetic reed switch 16. The switch 16 is a magnetic proximity device which is actuated in response to a magnetic field, which in this case is provided by a small magnet 17 which is fastened to the upper end of a plunger 18. The lower end of the plunger 18 passes through an opening in a bottom wall 14a of the compartment 14, and it terminates in a rubber or felt pad 19 which rests upon the surface of the key 12. When the key 12 is depressed, the magnet 17 drops downwardly sufficiently so that the switch 16, which is normally open, closes. In the present embodiment, only 21 compartments 14 are employed, so that only 21 keys 12 can be controlled. This is a reasonable number for elementary teaching purposes, and permits the use of comparatively inexpensive tape readers. However, it will be understood that more keys 12 could be controlled, if desired, in which case the housing 13 would correspondingly be longer.

Figure 3:
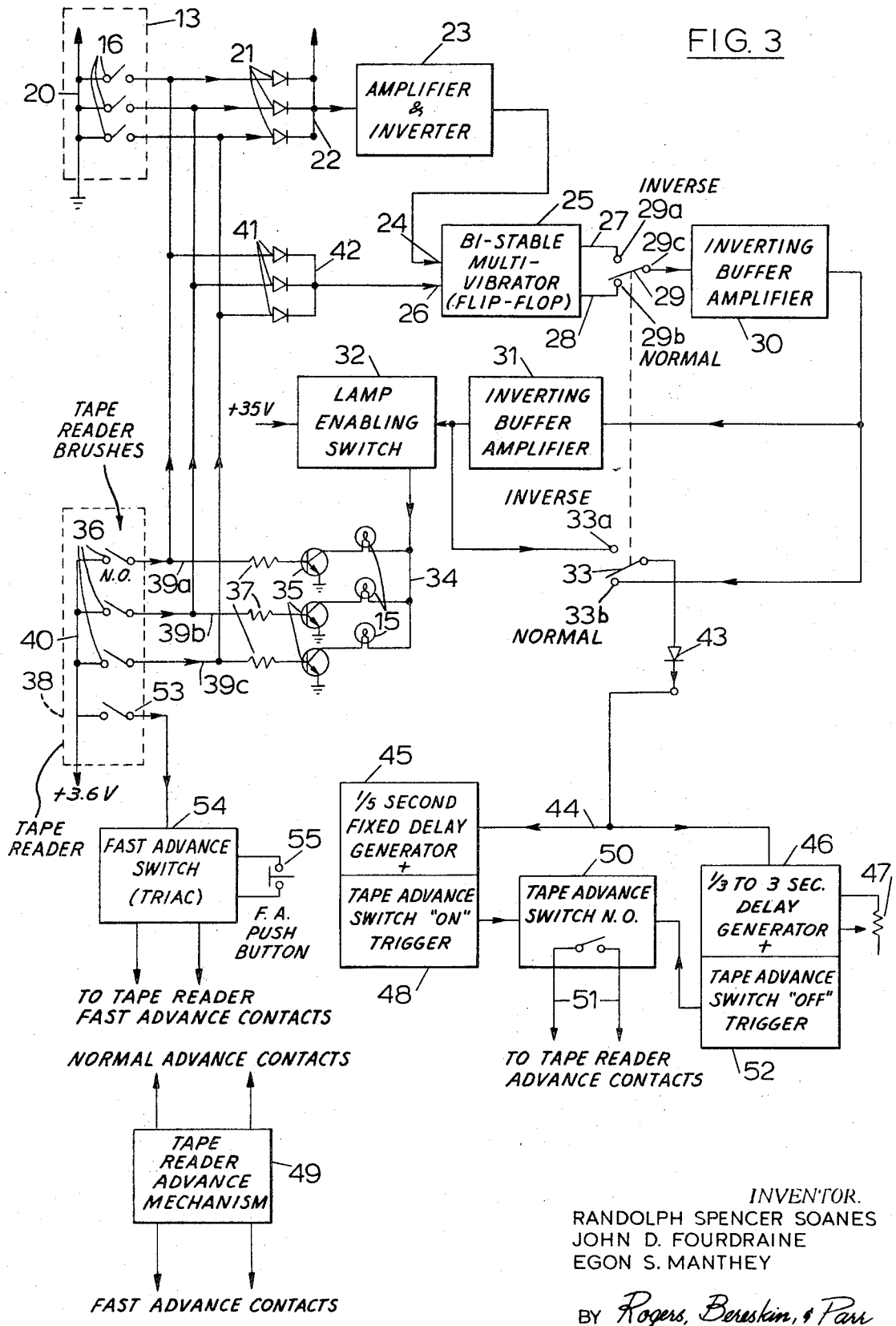
FIG. 3 is a block diagram of a preferred form of electronic circuitry associated with the invention.

Referring now to FIG. 3, one side of each of the magnetic reed switches 16 is grounded by a grounded lead 20, and the opposite sides of the switches 16 are respectively connected to the anodes of diodes 21, the cathodes of which are each connected to a common lead 22. For the sake of simplicity, only three switches 16 have been shown, but it will be understood that the complete circuit requires one switch 16 for each of the keys 12 to be controlled (e.g. 21 in this case). Similarly, there will be one diode 21 for each switch 16, although only 3 have been shown in FIG. 3. The common lead 22 is connected to the input of an amplifier 23 which also has the function of inverting the polarity of pulses appearing at its input. Amplified and inverted pulses appearing at the output of the amplifier 23 are fed to input 24 of a bistable multivibrator or flip-flop 25. Each stage of the flip-flop 25 has a separate input; the input 24 is connected to one stage, and input 26 is connected to the other stage. Similarly, the flip-flop 25 has two outputs 27, 28, one for each stage, and the respective outputs 27, 28 are connected to contacts 29a and 29b of a switch 29. The switch 29 has a contact 29c, which is connected to its moveable arm, and contact 29c is electrically connected to the input of buffer amplifier 30, the output of which also is inverted.

The output of the amplifier 30 is split into two parts. One part is fed to the input of another buffer amplifier 31, the output of which is also split into two parts. One part is fed to the input of a lamp enabling switch 32 (e.g. an emitter follower), and the other part is fed to contact 33a of a switch 30. One lead of each of the lamps 15 is connected to a common lead 34 which is connected to the output of the lamp-enabling switch 32. The other leads of the lamps 15 are respectively connected to the collectors of transistors 35, there being one transistor 35 for each lamp 15. The transistors 35 act as lamp drivers, with each emitter of each transistor being grounded. When the lamp-enabling switch 32 is turned on, voltage is supplied to the lamps 15 for illuminating them, but the lamps 15 remain extinguished until the associated transistor 35 is in a conductive state. The bases of the transistors 35 are respectively connected to one side of tape reader brushes 36 of a tape reader 38 through suitable dropping resistors 37 and leads 39a, 39b and 39c. The opposite sides of the brushes 36 are connected to a common lead 40 which is connected to a source of positive voltage such as 3.6 volts. Each brush 36 is a switch which is actuable by engagement with the holes of conventional tape of the kind commonly employed with mechanical tape reader mechanisms. When the brush 36 bears against the tape, no hole being present, the circuit through the brush 36 is open, but when a hole is present the circuit closes. When any brush 36 is open circuited, the associated transistor 35 is turned off and the associated lamp 15 is not illuminated. However, when a hole in the tape is present, and the circuit through the brush 36 closes, the associated lamp 15 becomes illuminated provided that the lamp-enabling switch 32 is turned on. It will be understood, of course, that there is one brush 36 for each key 12 to be controlled. The tape reader 38 is provided with an advance mechanism 49 consisting of a motor and indexing mechanism to permit the tape to be drawn in a stepwise manner past the brushes 36, which are arranged in line across the tape, in the conventional manner. The tape reader 38 and its associated advance mechanism 49 are conventional.

The leads 39a, 39b and 39c are respectively connected to the anodes of each of the diodes 21, and are also respectively connected to the anodes of another group of diodes 41, The cathodes of all the diodes 41 are connected together by a common lead 42 which is connected to the input 26 of the flip-flop 25.

As mentioned above, the output of the buffer amplifier 30 is split into two parts, one of which is fed to the input of the buffer amplifier 31. The other part is fed to contact 33b of the switch 33. The arm of the switch 33 is connected to a contact 33c which is connected to the anode of a diode 43. The cathode of the diode 43 is connected to a lead 44 which is connected to a 1/5th-second fixed delay generator 45 and to a ⅓ to 3 second variable delay generator 46. The time delay of the generator 46 is controllable by means of a potentiometer 47. The output of the delay generator 45 is connected to a trigger generator 48, the output of which is fed to one input of a tape advance switch 50. The switch 50 is connected to a pair of leads 51 which are connected to normal advance contacts of the advance mechanism 49 of the tape reader 38. Upon receipt of a trigger signal from the trigger generator 48, the switch 50 latches "on" shorting the circuit across the leads 51 thereby actuating the advance mechanism 49 which thereupon moves the tape in stepwise fashion to the next position. Before the advance mechanism 49 can be actuated again, the switch 50 must be opened. This is accomplished by means of a trigger generator 52, which is controlled by the delay generator 46, and which provides an "off" trigger for the purpose of opening the switch 50.

The tape used with the tape reader 38 is conventional, and as indicated above it is preprogrammed by punching holes at predetermined locations. The holes are arranged in groups, with the holes of each group being in alignment and positioned across the tape. Each group of holes is spaced from the adjacent groups by a constant interval, and the advance mechanism 49 is constructed so as to advance the tape stepwise from one position to the next with the holes of successive groups successively coming into contact with the associated brushes 36. Thus, any musical work can be coded on the tape, there being one hole for each note to be played. The tape is preferably, but not necessarily, put up in the form of a large loop so that the tape can be played endlessly without need to rewind. In order to facilitate finding the start of the lesson, one track of the tape is punched at the start of the lesson, and a separate brush 53 of the tape reader is used for sensing this hole. The brush 53 is identical to the brushes 36, but its sole function is to locate the hole identifying the start of the lesson and not to denote a particular key to be played. One side of the brush 53 is connected to the common lead 40, and the other side is connected to the input of a triac switch 54. A SPST switch 55 is also connected to the triac switch 54, and its function is to turn on the triac switch 54, causing the advance mechanism 49 to operate in its fast advance (continuous, not stepwise) mode until the brush 53 drops into the hole in the tape which identifies the start of the lesson, whereupon the switch 54 opens and the advance mechanism 49 is deenergized.

In normal mode operation, the respective arms of the switches 29 and 33 are in contact with contacts 29b and 33b (identified in FIG. 3 by the word "normal" beside the switches 29 and 33). It is assumed that a preprogrammed tape is in the tape reader 38 and has been advanced to the first group of holes. Accordingly, assuming that the three brushes 36 shown in FIG. 3 drop into holes present in the tape at this position, they become closed circuited and thus deliver positive voltage to the bases of the transistors 35. At the same time, the leads 39a, 39b and 39c which originally were at zero potential, abruptly rise to +3.6 volts, thereby sending a voltage pulse through the diodes 41 to input 26 of the flip-flop 25. This pulse causes the associated stage of the flip-flop 25 to turn off and a positive-going pulse appears at the output 28 of the flip-flop 25. This causes the lamp-emabling switch 32 to be turned on, and +35 volts is delivered to the lamps 15, which then become illuminated as the associated transistors 35 are biased to conduction. However, the same positive-going pulse is ineffective to trigger the delay generators 45, 46 as it is inverted by the amplifier 30 and therefore is blocked by the diode 43. The student observes which of the lamps 15 are illuminated, and thereupon depresses the keys 12 associated with the illuminated lamps 15. If, and only if all the keys 12 are correctly played, a negative-going pulse will be delivered to the input of the amplifier 23. This follows as a result of the fact that the input of the amplifier 23 is at +3.6 volts potential if any one of the brushes 36 is in its closed circuit condition, and the input of the amplifier 23 is shorted to ground only by the momentary closing of all the switches 16 associated with the keys 12 to be depressed. The output of the amplifier 23, which is a positive-going pulse, is delivered to the input 24 of the flip-flop 25, which thereupon "flips" or reverts to its other stable state, causing zero output voltage (there is no pulse, but merely a DR level change) to appear at its output 28. This pulse is then inverted by the amplifier 30, inverted again by the amplifier 31, and delivered to the lamp-enabling switch 32, thus turning it off and thereby extinguishing the lamps 15. At the same time, the inverted signal is delivered through the switch 33 and diode 43 to the delay generators 45 and 46. After a delay of one fifth second, the trigger generator delivers a trigger pulse to the tape advance switch 50, which closes the circuit between the leads 51 and activates the tape reader advance mechanism. After a further short delay (controlled by the potentiometer 47), the trigger generator 54 delivers a pulse to the tape advance switch 50, turning it off. The delay of one fifth second is required because the tape advance mechanism 49 requires a specified minimum period of actuation between successive actuations (in the present case one fifth second is a safe minimum). The average speed of the tape, however, is controlled by the potentiometer 47. As the student progresses, he can gradually decrease the minimum delay between successive actuations of the advance mechanism 49.

In the inverse mode of operation, the student is expected to read the notes to be played from a sheet of music with no assistance from the teaching device. In this mode, the switches 29 and 33 are in the "inverse" positions, with the arms of the switches 29 and 33 respectively connecting together the contacts 29a, 29c and 33a, 33c. Upon delivery to the input 26 of the flip-flop 25 of an input pulse from the tape reader (as explained above), a negative-going pulse appears at the output 27 of the flip-flop which is fed to the lamp enabling switch 32 after being amplified and inverted twice by the amplifiers 30 and 31. This negative pulse turns off the lamp enabling switch 32 and the lamps 15 remain dark. Note, however, that the pulse fed to the diode 43 is negative-going and is therefore blocked by the diode 43, because in this mode the anode of the diode 43 is connected to the output of the amplifier 31 instead of the amplifier 30. As soon as the correct keys 12 have been played, however, a positive-going pulse appears at the output 27 of the flip-flop, and thus a pulse of proper polarity appears for both turning on the lamp enabling switch 32 and for triggering the delay generators 45 and 46. Accordingly, the lamps become illuminated and the advance mechanism 49 is activated so that the tape is advanced to the next position, whereupon a further negative-going pulse appears at the input of the lamp enabling switch 32 cutting it off and extinguishing the lamps 15.

It will be understood that numerous modifications can be made to the embodiment described above without departing from the scope of the invention. For example, other known forms of data storage and retrieval systems such as those employing magnetic tape, photoelectric tape readers, etc. could be used instead of the punched hole type tape reader described herein. Similarly, while the invention has been described with reference to a keyboard instrument, particularly pianos and organs, it will be clear that principles of the invention are applicable to other instruments as well.

We claim:

1. Apparatus for teaching a student to play a musical instrument comprising:
   a. program means for sequentially scanning selected portions of stored data and for producing electrical signals which characterize each selected portion of said stored data, said stored data being arranged in groups in sequential order and said data groups being representative of groups of notes to be played sequentially on said instrument, said program means including an advance mechanism for moving said stored data stepwise past a scanning position, said advance mechanism being controllable by control signals, said advance mechanism being operable, upon receipt of one of said control signals, to move said stored data through a predetermined incremental distance equal to the separation of said groups of stored data and then to stop further travel of said stored data pending receipt of another of said control signals, said program means being operable to scan in stepwise fashion successive groups of stored date in response to successively applied control signals;

b. means for sensing the notes which have been played;

c. means connected to said sensing means for generating *a* control signal immediately after a predetermined group of notes has correctly been played, whereby said program means is caused to automatically shift from one group of said stored data to the next succeeding group; and d. display means coupled to said program means for visually identifying each note of said predetermined group.

2. Apparatus as claimed in claim 1 wherein said instrument has a keyboard containing a plurality of individually operable keys, wherein said display means includes a plurality of lamps with one lamp for each of said keys, said lamps remaining illuminated until each group of notes has correctly been played, and wherein said display means is responsive to said first set of electrical signals.

3. Apparatus as claimed in claim 1 wherein said instrument has a keyboard containing a plurality of individually operable keys, wherein said display means includes a plurality of lamps with one lamp for each of said keys, and wherein said lamps remain extinguished until each group of notes has correctly been played.

4. Apparatus as claimed in claim 2 wherein means is provided for varying the time between the initiation of a control signal and the start of the immediately following scan of said program means.

5. Apparatus as claimed in claim 2 wherein said program means includes a tape reader, wherein said data is in the form of holes punched in the tape, wherein said sensing means includes a plurality of switches operated by said keys with one of said switches for each key, and wherein said control signal generating means includes a bistable multivibrator having set and reset inputs, said program means including first circuit means connected to the set input of the multivibrator for producing a pulse upon each successive shift of said program means.

6. Apparatus as claimed in claim 5 wherein said control signal-generating means further includes a plurality of diodes respectively connected at one end to the switches of said sensing means, the opposite ends of said diodes being connected together and connected to the input of an inverting amplifier, and second circuit means connecting the switches of said sensing means with the program means for producing an input signal fed to said inverting amplifier when each said predetermined group of notes has correctly been played.